(12) United States Patent
Tsubakino

(10) Patent No.: US 11,644,082 B2
(45) Date of Patent: May 9, 2023

(54) TRANSMISSION BELT

(71) Applicant: BANDO CHEMICAL INDUSTRIES, LTD., Kobe (JP)

(72) Inventor: Kazuyuki Tsubakino, Kobe (JP)

(73) Assignee: BANDO CHEMICAL INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/994,270

(22) Filed: Nov. 25, 2022

(65) Prior Publication Data

US 2023/0088538 A1    Mar. 23, 2023

Related U.S. Application Data

(63) Continuation of application No. PCT/JP2021/024894, filed on Jul. 1, 2021.

(30) Foreign Application Priority Data

Jul. 3, 2020    (JP) .............................. JP2020-115523

(51) Int. Cl.
| | | |
|---|---|---|
| *F16G 1/28* | (2006.01) | |
| *F16G 1/26* | (2006.01) | |
| *D02G 3/44* | (2006.01) | |
| *D02G 3/26* | (2006.01) | |

(52) U.S. Cl.
CPC ................. *F16G 1/28* (2013.01); *D02G 3/26* (2013.01); *D02G 3/44* (2013.01); *F16G 1/26* (2013.01); *D10B 2101/12* (2013.01); *D10B 2401/06* (2013.01); *D10B 2505/00* (2013.01)

(58) Field of Classification Search
CPC ..... F16G 1/28; F16G 1/10; F16G 1/06; F16G 1/08; F16G 1/18; F16G 1/14; F16G 1/16; F16G 1/26; D02G 3/26; D02G 3/44
USPC ......................................................... 474/205
See application file for complete search history.

(56) References Cited

U.S. PATENT DOCUMENTS

| | | | | | |
|---|---|---|---|---|---|
| 3,404,578 | A | * | 10/1968 | Koch ........................ | F16G 1/14 416/241 A |
| 4,826,472 | A | * | 5/1989 | Sato ........................ | B29D 29/08 474/205 |
| 5,160,301 | A | * | 11/1992 | Nakanishi ................ | F16G 5/06 474/263 |
| 5,242,743 | A | * | 9/1993 | Nakanishi ................ | D04C 1/12 87/10 |
| 5,268,221 | A | * | 12/1993 | Nakanishi .............. | D02G 3/447 474/260 |
| 5,342,252 | A | * | 8/1994 | Fujiwara .................. | F16G 1/28 474/268 |
| 5,478,286 | A | * | 12/1995 | Hamano ................... | F16G 1/28 474/271 |

(Continued)

FOREIGN PATENT DOCUMENTS

JP    2005-24075 A    1/2005

*Primary Examiner* — Henry Y Liu
(74) *Attorney, Agent, or Firm* — Maschoff Brennan

(57) ABSTRACT

A power transmission belt includes a belt body made of an elastomer, and a cord made of carbon fibers and embedded in the belt body. The belt tension $T_{0.2}$ per 1 mm belt width at 0.2% of a belt extension rate is 70 N/mm or more. The belt tension $T_{0.5}$ per 1 mm belt width at 0.5% of the belt extension rate is 220 N/mm or more. The ratio of the belt tension $T_{0.2}$ to the belt tension $T_{0.5}$ is 0.33 or more.

12 Claims, 4 Drawing Sheets

(56) References Cited

U.S. PATENT DOCUMENTS

| | | | | |
|---|---|---|---|---|
| 5,529,545 | A * | 6/1996 | Isshiki | F16G 1/28 474/267 |
| 5,735,763 | A * | 4/1998 | Kawahara | F16G 5/06 474/263 |
| 6,419,775 | B1 * | 7/2002 | Gibson | B32B 25/10 156/137 |
| 6,620,068 | B2 * | 9/2003 | Ito | F16G 5/20 474/251 |
| 8,142,316 | B2 * | 3/2012 | Goettsch | F16G 5/20 474/271 |
| 2001/0051555 | A1 * | 12/2001 | Isshiki | F16G 1/28 474/263 |
| 2002/0042317 | A1 * | 4/2002 | South | F16G 5/20 474/263 |
| 2002/0187869 | A1 * | 12/2002 | Martin | F16G 5/20 474/263 |
| 2003/0139241 | A1 * | 7/2003 | Edamatsu | F16H 55/171 474/205 |
| 2006/0079362 | A1 * | 4/2006 | Tomobuchi | F16G 1/28 474/260 |
| 2007/0281814 | A1 * | 12/2007 | Baldovino | D02G 3/447 474/205 |
| 2009/0011883 | A1 * | 1/2009 | Wu | D02G 3/447 474/205 |
| 2011/0118068 | A1 * | 5/2011 | Mitsutomi | F16G 1/10 474/205 |
| 2012/0077631 | A1 * | 3/2012 | Wang | F16H 7/023 474/205 |
| 2014/0206487 | A1 * | 7/2014 | Tomobuchi | C08J 5/046 474/205 |
| 2016/0053850 | A1 * | 2/2016 | Brocke | F16G 1/10 474/205 |
| 2016/0069420 | A1 * | 3/2016 | Sekiguchi | F16G 1/10 264/157 |
| 2021/0018063 | A1 * | 1/2021 | Noborikawa | D03D 1/0094 |
| 2021/0040682 | A1 * | 2/2021 | Shimokawa | D06M 15/41 |
| 2021/0047505 | A1 * | 2/2021 | Loyd | C08F 4/6592 |

* cited by examiner

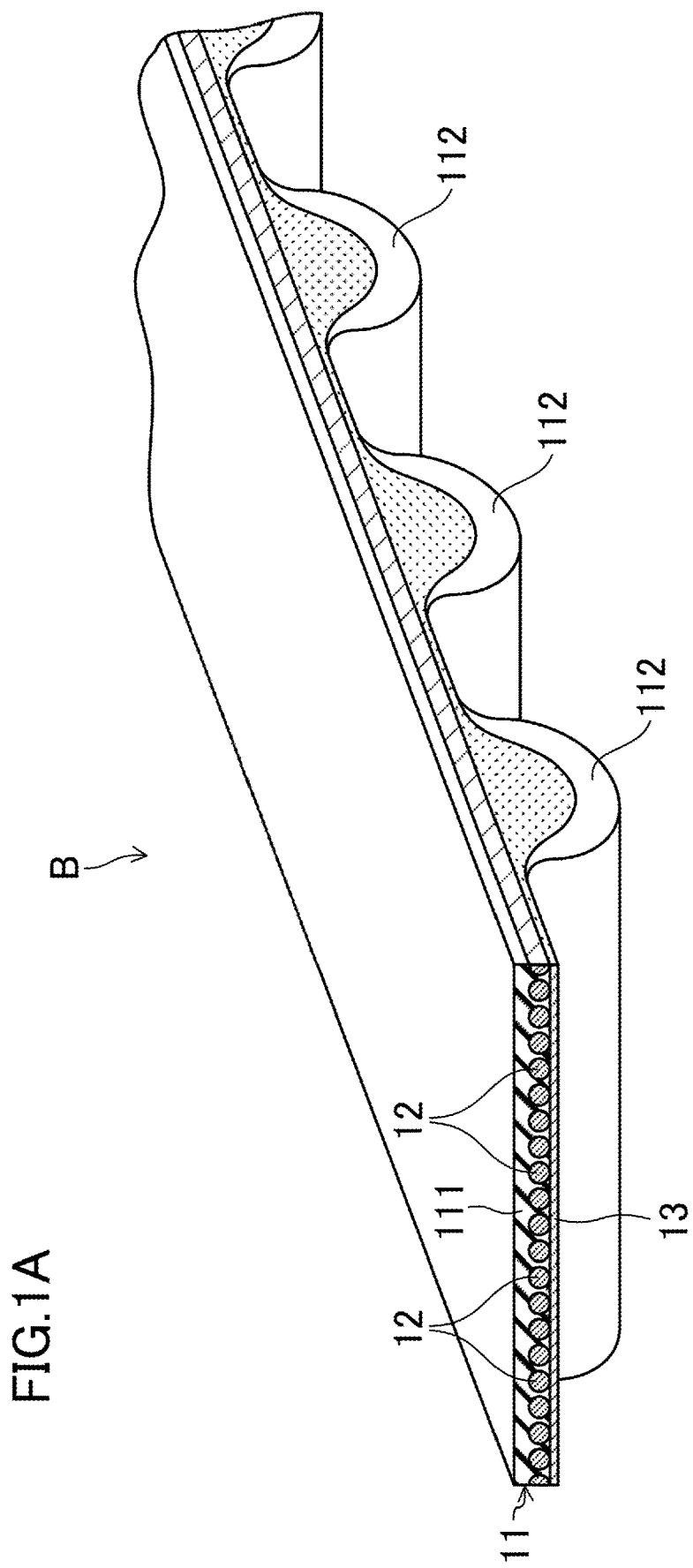

TRANSMISSION BELT

CROSS-REFERENCE TO RELATED APPLICATION

This is a continuation of International Application No. PCT/JP2021/024894 filed on Jul. 1, 2021, which claims priority to Japanese Patent Application No. 2020-115523 filed on Jul. 3, 2020. The entire disclosures of these applications are incorporated by reference herein.

BACKGROUND

The present invention relates to a power transmission belt. A power transmission belt using a cord made of carbon fibers has been known. For example, Japanese Unexamined Patent Publication No. 2005-24075 discloses a toothed belt in which a cord made of carbon fibers is embedded in a belt body made of rubber.

SUMMARY

The present invention is directed to a power transmission belt including a belt body made of an elastomer, and a cord made of carbon fibers and provided to be embedded in the belt body and to form a helical pattern having a pitch in a belt width direction. A belt tension $T_{0.2}$ per 1 mm belt width at 0.2% of a belt extension rate is 70 N/mm or more, a belt tension $T_{0.5}$ per 1 mm belt width at 0.5% of the belt extension rate is 220 N/mm or more, and a ratio of the belt tension $T_{0.2}$ to the belt tension $T_{0.5}$ is 0.33 or more.

BRIEF DESCRIPTION OF THE DRAWINGS

FIG. 1A is a perspective view of a piece of a toothed belt of an embodiment.

DESCRIPTION OF EMBODIMENT

An embodiment will be described in detail below with reference to the drawings.

Figure 1B:
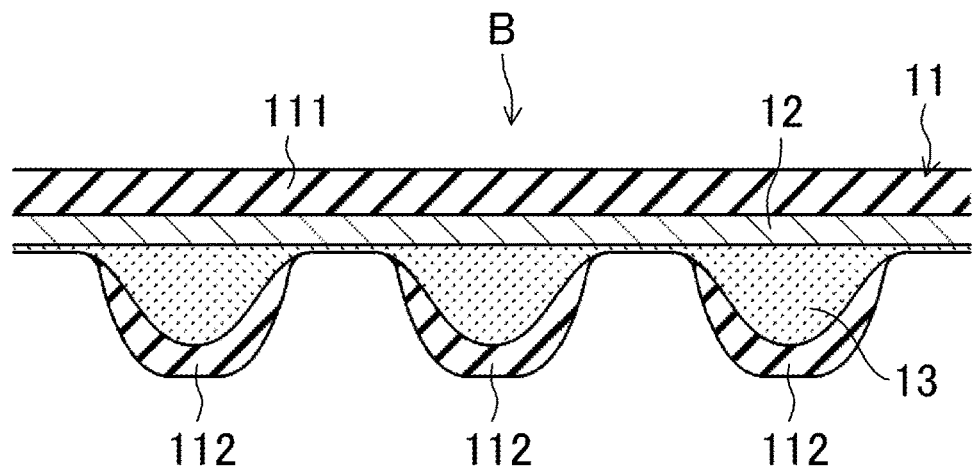
FIG. 1B is a longitudinal cross-sectional view of a portion of the toothed belt of the embodiment.

FIGS. 1A and 1B illustrate a toothed belt B of an embodiment. The toothed belt B of the embodiment is an engagement power transmission belt and is advantageously used for high load transmission of machine tools, printing machines, textile machines, and injection machines, for example. The toothed belt B of the embodiment has a belt length of, for example, 500 mm or more to 3000 mm or less. The toothed belt B of the embodiment has a belt width of, for example, 10 mm or more to 200 mm or less. The toothed belt B of the embodiment has a (maximum) belt thickness of, for example, 3 mm or more to 20 mm or less.

The toothed belt B of the embodiment includes an elastomer-made endless toothed belt body 11 made of polyurethane resin. The toothed belt body 11 includes a flat band portion 111 having a horizontally elongated rectangular cross-section and a plurality of teeth 112 provided on the inner periphery of the flat band portion 111 so as to be integral therewith. The teeth 112 are provided at a constant pitch in a belt length direction.

Examples of the tooth profile of the each tooth 112 in the side view include an arc tooth profile of the super torque synchronous (STS) belts in which both sides of the tooth are bowed outward in the form of an arc and a trapezoidal tooth profile. The number of teeth 112 is, for example, 30 or more to 400 or less. The teeth 112 each have a width (the maximum dimension in the belt length direction) of, for example, 2 mm or more to 10 mm or less. The teeth 112 each have a height of, for example, 2 mm or more to 8 mm or less. The teeth 112 are arranged at a pitch of, for example 8 mm or more to 14 mm or less.

The polyurethane resin forming the toothed belt body 11 is obtained by heating, pressurizing, and curing an urethan composition which is obtained by blending a curing agent, a plasticizer, and the like to a urethan prepolymer.

The urethan prepolymer is a relatively low molecular weight urethan compound which is obtained by a reaction between an isocyanate component and a polyol component and having a plurality of NCO groups at its terminals. Examples of the isocyanate component include tolylene diisocyanate (TDI) and diphenylmethane diisocyanate (MDI). Examples of the polyol component include poly tetramethylene ether glycol (PTMG). The urethan prepolymer may be composed of a single urethan prepolymer or a plurality of urethan compounds blended.

Examples of the curing agent include amine compounds such as 1,4-phenylene diamine, 2,6-diamino toluene, 1,5-naphthalene diamine, 4,4'-diamino diphenylmethane, and 3,3'-dichloro-4,4'-diamino diphenylmethane (MOCA). The curing agent suitably contains one kind or two or more kinds of them. The amine compound serving as a curing agent is suitably blended to have an α value ($NH_2$ group/NCO group) of 0.70 or more to 1.10 or less. The α value is a ratio of the amount of $NH_2$ groups by mole in the curing agent to the amount of NCO groups by mole in the urethan prepolymer.

Examples of the plasticizer include: dialkyl phthalates such as dibutylphthalate (DBP) and dioctyl phthalate (DOP); dialkyl adipates such as dioctyl adipate (DOA); and dialkyl sebacate such as dioctyl sebacate (DOS). The plasticizer suitably contains one kind or two or more kinds of them. The plasticizer is blended at 3 parts by mass or more to 20 parts by mass or less relative to 100 parts by mass of the urethan prepolymer.

Example of the other compound ingredients include a colorant, an antifoaming agent, and a stabilizer.

The polyurethane resin forming the toothed belt body 11 has a hardness of, for example, 70° or more to 100° or less. The hardness of the polyurethane resin is measured in accordance with JIS K 7312: 1996.

The toothed belt B of the embodiment includes a cord 12 made of carbon fibers and embedded in the flat band portion 111 of the toothed belt body 11. The cord 12 has an outer diameter of suitably 0.6 mm or more to 2.2 mm or less, more suitably 0.8 mm or more to 1.2 mm or less, in terms of obtaining excellent durability in high load transmission.

The carbon fibers forming the cord 12 are suitably PAN-based carbon fibers, in terms of obtaining excellent durability in high load transmission. The carbon fibers each have a filament diameter of suitably 4 μm or more to 9 μm or less, more suitably 6 μm or more to 8 μm or less.

The total number of filaments of the carbon fibers forming the cord 12 is suitably 6000 (6K) or more to 48000 (48K) or less, more suitably 9000 (9K) or more to 18000 (18K) or less, yet more suitably 12000 (12K), in terms of obtaining excellent durability in high load transmission. The carbon fibers forming the cord 12 have a fiber fineness of suitably 400 tex or more to 3200 tex or less, more suitably 600 tex or more to 1200 tex or less, yet more suitably 800 tex, in terms of the same.

The cord 12 is suitably a twisted yarn, in terms of obtaining excellent durability in high load transmission. The twisted yarn forming the cord 12 includes a single twist yarn, a plied yarn, and a lang's lay. The cord 12 of the twisted yarn is suitably a single twist yarn obtained by twisting a filament bundle of the carbon fibers in one direction. The number of twists of the cord 12 of the single twist yarn is suitably 4/10 cm or more to 12/10 cm or less, more suitably 6/10 cm or more to 10/10 cm or less, in terms of the same. For the cord 12 of the single twist yarn, either an S-twist yarn or a Z-twist yarn may be used, or both of them may be used.

The cord 12 is provided to form a helical pattern with a pitch in the belt width direction. The cord 12 may be made of two yarns of the S-twist yarn and the Z-twist yarn arranged in a double helix form. The cords 12 are disposed to extend in parallel with each other at intervals in the belt width direction, and the number of cords 12 per 10 mm belt width of the cord 12 is suitably 6/10 mm or more to 10/10 mm or less, more suitably 7/10 mm or more to 9/10 mm or less, in terms of obtaining excellent durability in high load transmission.

The cord 12 has been suitably subjected to adhesion treatment such as immersing it in a liquid adhesive agent and then drying before molding.

The toothed belt B of the embodiment further includes unwoven fabric 13 embedded along the belt length direction on the inner peripheral side of the toothed belt body 11 from the position at which the cord 12 is embedded in the belt thickness direction. The unwoven fabric 13 may be made of a single sheet or a plurality of sheets.

The unwoven fabric 13 contains polyurethane resin forming the toothed belt body 11, and provided to form a layer in a side view. Portions of the unwoven fabric 13 corresponding to the respective teeth 112 extend inside the teeth 112 so as to bulge toward inner periphery in a side view and expand thickly in the belt thickness direction. Portions of the unwoven fabric 13 corresponding to the portions between the teeth 112 are in contact with the cords 12 and are compressed in the belt thickness direction to be thin.

Examples of the fiber material forming the unwoven fabric 13 include nylon fibers, polyester fibers, aramid fibers, polyketone fibers, and carbon fibers. The unwoven fabric 13 may be made of a single kind of fibers, or a mixture of a plurality of kinds of fibers.

The unwoven fabric 13 has been suitably subjected to adhesion treatment such as immersing it in a liquid adhesive agent and then drying before molding.

In the toothed belt B according to the embodiment, the belt tension $T_{0.2}$ per 1 mm belt width at 0.2% of a belt extension rate is 70 N/mm or more. The belt tension $T_{0.2}$ is suitably 80 N/mm or more, more suitably 90 N/mm or more, in terms of obtaining excellent durability in high load transmission. The belt tension $T_{0.2}$ is suitably 140 N/mm or less, more suitably 120 N/mm or less, in terms of avoiding impairing of flex fatigue resistance due to increase in flexural rigidity.

In the toothed belt B according to the embodiment, the belt tension $T_{0.5}$ per 1 mm belt width at 0.5% of a belt extension rate is 220 N/mm or more. The belt tension $T_{0.5}$ is suitably 230 N/mm or more, more suitably 240 N/mm or more, in terms of obtaining excellent durability in high load transmission. The belt tension $T_{0.5}$ is suitably 440 N/mm or less, more suitably 300 N/mm or less, in terms of avoiding impairing of flex fatigue resistance due to increase in flexural rigidity.

The belt tension $T_{0.2}$ and the belt tension $T_{0.5}$ are determined as follows.

Figure 2:
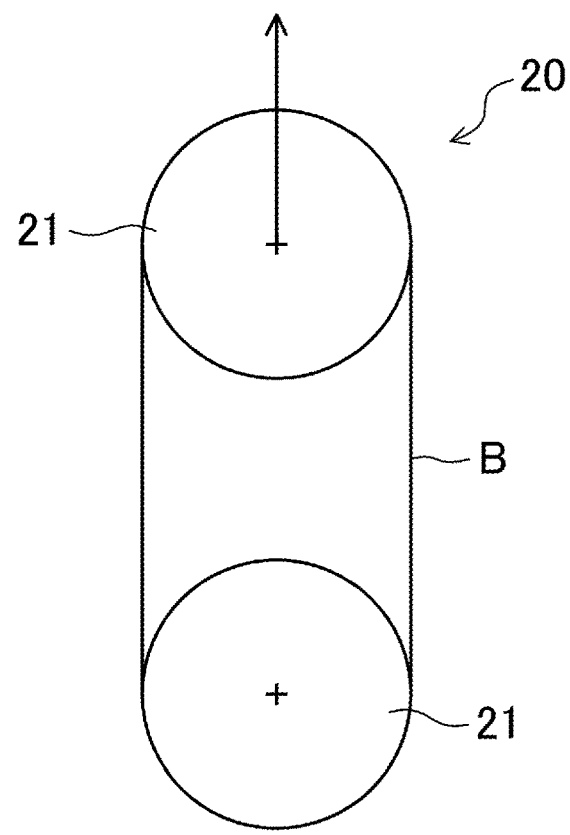
FIG. 2 shows a configuration of a belt tensile tester.

In a 25° C. atmosphere, the toothed belt B according to the embodiment is wrapped around a pair of flat pulleys 21 with a pulley diameter of 95.4 mm in a belt tensile tester 20 such that a belt backface comes into contact with the flat pulleys 21, as shown in FIG. 2.

Then, one of the flat pulleys 21 is separated from the other flat pulley 21 at a speed of 50 mm/min. At this time, the relationship between displacement between the flat pulleys 21 in pair and the tension detected via either one of the flat pulleys 21 in pair is recorded.

Then, the displacement between the flat pulleys 21 in pair is doubled to calculate the amount of extension of the belt, which is then divided by the belt length of the toothed belt B according to the embodiment under a no-load condition. Thus, the displacement between flat pulleys 21 in pair is converted into the belt extension rate. Further, the tension detected is divided by 2 to calculate the belt tension, which is then divided by the belt width of the toothed belt B according to the embodiment. Thus, the tension detected is converted into the belt tension per 1 mm belt width.

Then, zero-point amendment is performed based on the relationship between the belt extension rate and the belt tension so that the point at which the belt tension per 1 mm belt width reaches 50N is a starting point, and the belt tension $T_{0.2}$ and the belt tension $T_{0.5}$ are determined.

In the toothed belt B according to the embodiment, the ratio of the belt tension $T_{0.2}$ to the belt tension $T_{0.5}$ (the belt tension $T_{0.2}$/the belt tension $T_{0.5}$) is 0.33 or more. The belt tension $T_{0.2}$/the belt tension $T_{0.5}$ is suitably 0.35 or more, more suitably 0.38 or more, in terms of obtaining excellent durability in high load transmission. The belt tension $T_{0.2}$/the belt tension $T_{0.5}$ is suitably 0.55 or less, more suitably 0.50 or less, yet more suitably 0.45 or less, in terms of practical use.

In the toothed belt B according to the embodiment with such a configuration, the belt tension $T_{0.2}$ is 70 N/mm or more, the belt tension $T_{0.5}$ is 220 N/mm or more, and the ratio of the belt tension $T_{0.2}$ to the belt tension $T_{0.5}$ is 0.33 or more. Accordingly, excellent durability in high load transmission can be obtained. This is presumably because the belt tension $T_{0.2}$ is 70 N/mm or more and the belt tension $T_{0.5}$ is 220 N/mm or more, which provide excellent dimensional stability in use under wide range of high loads, and the belt tension $T_{0.2}$/the belt tension $T_{0.5}$ is 0.33 or more, which suppresses excessive tension even if the belt extension rate increases due to thermal expansion of pulleys, for example, thereby suppressing progress of wearing.

Next, a method for forming the toothed belt B of the embodiment will be described.

Figure 3A:
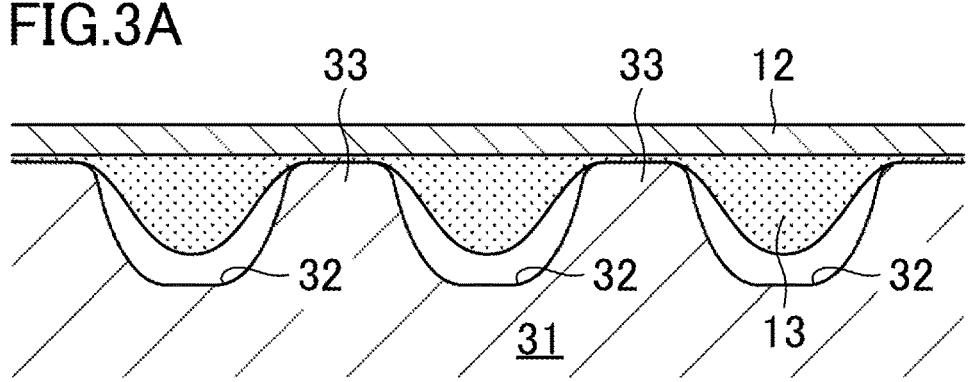
FIG. 3A is a first diagram illustrating a method for forming the toothed belt according to the embodiment.

First, as shown in FIG. 3A, a cylindrical inner mold 31 is covered with the unwoven fabric 13, and the cord 12 is then spirally wound around it. At this time, on the outer periphery of the inner mold 31, recesses 32 with cross sectional shapes corresponding to the respective teeth 112 extending axially are provided at a constant pitch at intervals in a circumferential direction, and ridges 33 extending axially between the recesses 32 are formed. Then, the unwoven fabric 13 and cord 12 are provided to be supported with the ridges 33.

Figure 3B:
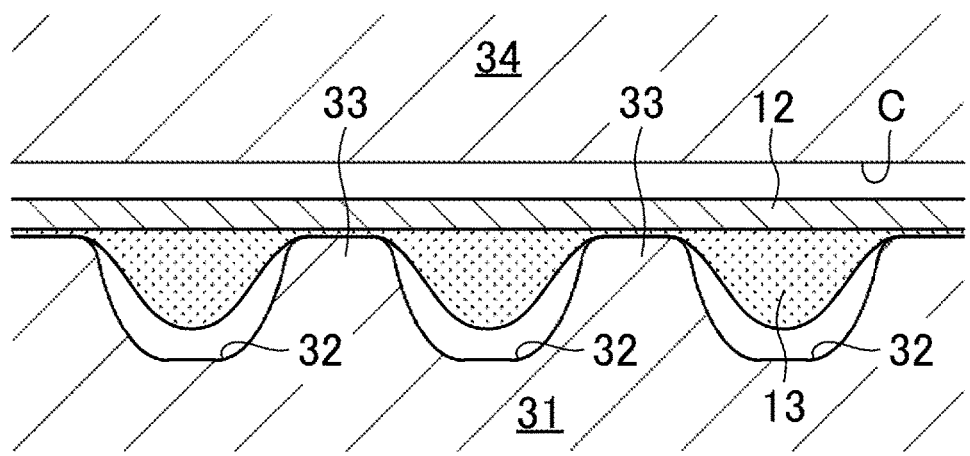
FIG. 3B is a second diagram illustrating the method for forming the toothed belt according to the embodiment.

Then, as shown in FIG. 3B, the inner mold 31 is housed in a cylindrical outer mold 34. At this time, a cavity C for molding the toothed belt body is formed between the inner mold 31 and the outer mold 34.

Figure 3C:
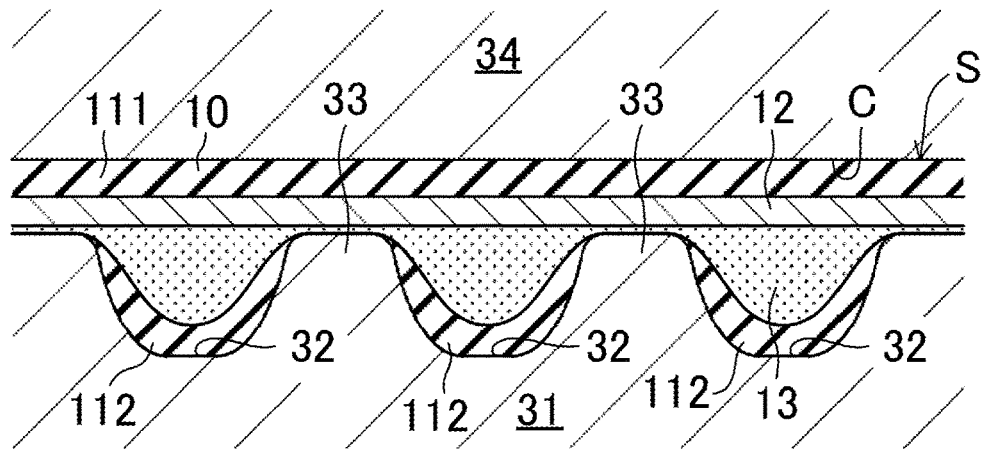
FIG. 3C is a third diagram illustrating the method for forming the toothed belt according to the embodiment.

Subsequently, as shown in FIG. 3C, a liquid urethan composition obtained by blending a compound ingredient into a urethan prepolymer is injected and charged into the closed cavity C. At this time, a toothed belt body 11 of polyurethane resin is formed by the urethan composition flowing and cured. Further, the teeth 112 are formed in the recesses 32. The cord 12 is adhered and embedded in the toothed belt body 11. The urethan composition is impregnated into the unwoven fabric 13 and then cured, and the unwoven fabric 13 is adhered to and embedded in the toothed belt body 11. In this way, the toothed belt body 11, the cord 12, and the unwoven fabric 13 are integrated to form a cylindrical belt slab S.

Finally, the belt slab S is demolded from the inner mold 31 and the outer mold 34, and cut into round slices, whereby the toothed belt B according to the embodiment is obtained.

In the embodiment described above, the toothed belt B is made of the toothed belt body 11, the cord 12, and the unwoven fabric 13, but is not limited thereto. A reinforcing fabric may be provided on the teeth face on the inner periphery side of the toothed belt body and/or the backface on the outer periphery side of the toothed belt body.

In the embodiment, the toothed belt B includes a toothed belt body made of polyurethane resin, but is not particularly limited thereto. The toothed belt body may be formed of a crosslinking rubber composition.

In the embodiment, the toothed belt B is shown as a power transmission belt, but the power transmission belt is not particularly limited thereto and may be a flat belt, a V-belt, a V-ribbed belt, or the like.

EXAMPLE (Toothed Belt)

Toothed belts of Example and Comparative Examples 1 to 3 were prepared. Constituents of each belt will also be shown in Table 1.

EXAMPLE

A STS toothed belt with the same configuration as in the embodiment was prepared as Example.

The toothed belt of Example had a belt length of 800 mm, a belt width of 8 mm, and a belt thickness (at maximum) of 4.8 mm. The teeth were S8M defined in ISO 13050: 2014 (E).

As the urethan composition for forming a toothed belt body, one obtained by blending 13 parts by mass of 3,3'-dichloro-4,4'-diamino diphenylmethane as a curing agent and 10 parts by mass of dioctyl phthalate as a plasticizer to 100 parts by mass of urethan prepolymer was used. A polyurethane resin which forms the toothed belt body had a hardness of 92°, measured based on JIS K7312.

As a cord, a single twist yarn obtained by twisting a filament bundle of carbon fibers (Tenax-J UTS50 F22, manufactured by TEIJIN LIMITED, 12K, 800 tex, a filament diameter: 7.0 μm) each with the number of filaments of 12000 in one direction and with the number of twists per 10 cm length of 6/10 cm was used. For the cord of single twist yarn, a S-twist yarn and a Z-twist yarn were provided, and were subjected to adhesion treatment of immersing them in an adhesive and drying. The S-twist yarn and the Z-twist yarn which form a single twist yarn for the cord are arranged alternately in the belt width direction to form a double helix pattern. The number of cords per 10 mm of the belt width was eight. The cord had an outer diameter of 0.9 mm.

As unwoven fabric, one made of nylon fibers and formed by needle punching without pressurization was used. The unwoven fabric was not subjected to adhesion treatment.

In the toothed belt of Example, the belt tension $T_{0.2}$ was 100 N/mm, and the belt tension $T_{0.5}$ was 250 N/mm. Thus, the belt tension $T_{0.2}$/the belt tension $T_{0.5}$ was 0.40.

Comparative Example 1

A toothed belt with the same configuration as in Example except that the number of cords per 10 cm belt width was 6 was prepared as Comparative Example 1.

In the toothed belt of Comparative Example 1, the belt tension $T_{0.2}$ was 65 N/mm, and the belt tension $T_{0.5}$ was 200 N/mm. Thus, the belt tension $T_{0.2}$/the belt tension $T_{0.5}$ was 0.33.

Comparative Example 2

A toothed belt with the same configuration as in Example except that the number of twists of the cord per 10 cm length was 12/10 cm and the number of cords per 10 cm belt width was 6 was prepared as Comparative Example 2. The cord had an outer diameter of 1.0 mm.

In the toothed belt of Comparative Example 2, the belt tension $T_{0.2}$ was 80 N/mm, and the belt tension $T_{0.5}$ was 260 N/mm. Thus, the belt tension $T_{0.2}$/the belt tension $T_{0.5}$ was 0.31.

Comparative Example 3

A toothed belt with the same configuration as in Example except that the number of twists of the cord per 10 cm length was 9/10 cm was prepared as Comparative Example 3. The cord had an outer diameter of 1.0 mm.

In the toothed belt of Comparative Example 3, the belt tension $T_{0.2}$ was 80 N/mm, and the belt tension $T_{0.5}$ was 210 N/mm. Thus, the belt tension $T_{0.2}$/the belt tension $T_{0.5}$ was 0.38.

TABLE 1

|  | Example | Comparative Example 1 | Comparative Example 2 | Comparative Example 3 |
| --- | --- | --- | --- | --- |
| Number of Twists (per 10 cm) | 6 | 6 | 12 | 9 |
| Number of Cords (per 10 mm) | 8 | 6 | 10 | 8 |
| Belt Tension $T_{0.2}$ (N/mm) | 100 | 65 | 80 | 80 |
| Belt Tension $T_{0.5}$ (N/mm) | 250 | 200 | 260 | 210 |
| Belt Tension $T_{0.2}$ (N/mm)/ Belt Tension $T_{0.5}$ (N/mm) | 0.40 | 0.33 | 0.31 | 0.38 |
| High Load Durability Life (hour) | 510 | 90 | 171 | 351 |

(High Load Durability Test)

Figure 4:
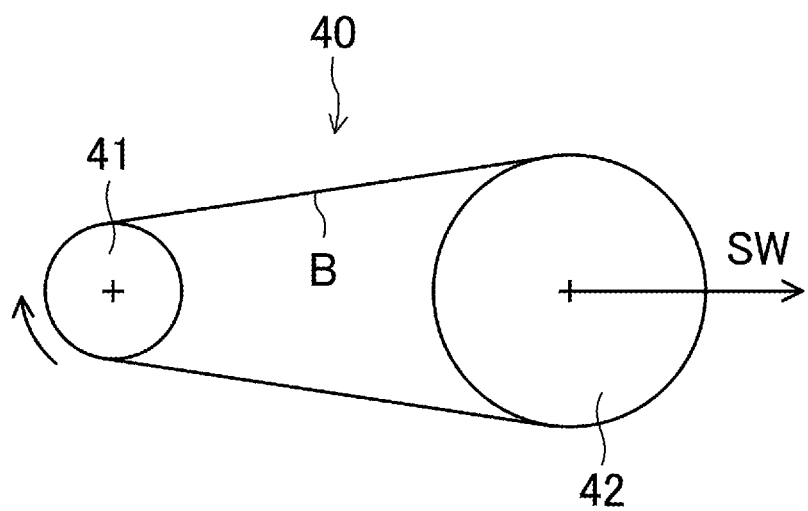
FIG. 4 is a view of a layout of pulleys of a belt running tester.

FIG. 4 shows a layout of pulleys in the belt running tester 40 used in a high load durability test. The belt running tester 40 includes a drive pulley 41 with 22 teeth and a driven pulley 42 with 33 teeth, provided on the right side of the drive pulley 41. The driven pulley 42 is provided to be movable to the left or right side, and is configured to be applied with an axial load and a load torque.

In a 60° C. atmosphere, each of the toothed belts B of Example and Comparative Examples 1 to 3 was wrapped around the drive pulley 41 and the driven pulley 42, applied with a fixed axial load (SW) of 608N to apply tension to the toothed belt B, and applied with a load torque of 34.24 N·m. In this state, the drive pulley 41 was rotated at the number of revolutions of 4212 rpm. Then, the time until the toothed belt B was broken was measured, and the time was used as a high load durability life.

(Test Results)

Table 1 shows the test results. As can be seen, durability in high load transmission in Example was significantly higher than that in each of Comparative Examples 1 to 3.

The embodiments have been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A power transmission belt including a belt body made of an elastomer, and a cord made of carbon fibers and provided to be embedded in the belt body and to form a helical pattern having a pitch in a belt width direction, a belt tension $T_{0.2}$ per 1 mm belt width at 0.2% of a belt extension rate being 70 N/mm or more, a belt tension $T_{0.5}$ per 1 mm belt width at 0.5% of the belt extension rate being 220 N/mm or more, a ratio of the belt tension $T_{0.2}$ to the belt tension $T_{0.5}$ being 0.33 or more.

2. The power transmission belt of claim 1, wherein the belt body is made of a polyurethane resin.

3. The power transmission belt of claim 1, wherein the carbon fibers forming the cord are PAN-based carbon fibers.

4. The power transmission belt of claim 1, wherein the carbon fibers have a filament diameter of 4 μm or more to 9 μm or less.

5. The power transmission belt of claim 1, wherein a total number of filaments of the carbon fibers forming the cord is 6000 or more to 48000 or less.

6. The power transmission belt of claim 1, wherein the cord is a single twist yarn obtained by twisting a filament bundle of the carbon fibers in one direction.

7. The power transmission belt of claim 6, wherein the number of twists of the cord of the single twist yarn per 10 cm length is 4/10 cm or more to 12/10 cm or less.

8. The power transmission belt of claim 1, wherein the number of cords per 10 mm belt width is 6/10 mm or more to 10/10 mm or less.

9. The power transmission belt of claim 1, wherein a belt tension $T_{0.2}$ per 1 mm belt width at 0.2% of the belt extension rate is 140 N/mm or less.

10. The power transmission belt of claim 1, wherein a belt tension $T_{0.5}$ per 1 mm belt width at 0.5% of the belt extension rate is 440 N/mm or less.

11. The power transmission belt of claim 1, wherein the belt tension $T_{0.2}$/the belt tension $T_{0.5}$ is 0.55 or less.

12. The power transmission belt of claim 1, wherein the belt body is a toothed belt body.

\* \* \* \* \*